(12) United States Patent
Zhang et al.

(10) Patent No.: US 12,145,593 B2
(45) Date of Patent: Nov. 19, 2024

(54) DATA PROCESSING

(71) Applicant: BAIDU USA LLC, Sunnyvale, CA (US)

(72) Inventors: Xinyang Zhang, Sunnyvale, CA (US); Zhisheng Hu, Sunnyvale, CA (US); Zhenyu Zhong, Sunnyvale, CA (US); Kang Li, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 380 days.

(21) Appl. No.: 17/714,457

(22) Filed: Apr. 6, 2022

(65) Prior Publication Data

US 2022/0227374 A1    Jul. 21, 2022

(51) Int. Cl.
*B60W 40/00*    (2006.01)
*B60W 40/04*    (2006.01)
*B60W 40/06*    (2012.01)
*B60W 60/00*    (2020.01)

(52) U.S. Cl.
CPC ............ *B60W 40/06* (2013.01); *B60W 40/04* (2013.01); *B60W 60/0015* (2020.02); *B60W 2420/403* (2013.01); *B60W 2552/53* (2020.02); *B60W 2555/20* (2020.02)

(58) Field of Classification Search
CPC .. B60W 40/06; B60W 60/0015; B60W 40/04; B60W 2552/53; B60W 2555/20; B60W 2420/403
USPC .......................................................... 701/26
See application file for complete search history.

(56) References Cited

U.S. PATENT DOCUMENTS

| | | | | |
|---|---|---|---|---|
| 2016/0203413 | A1* | 7/2016 | Ruiz ........................ | G06N 7/08 706/52 |
| 2018/0029610 | A1* | 2/2018 | McNew ............ | B60W 50/0097 |
| 2019/0361442 | A1* | 11/2019 | Izaki ..................... | G08G 1/166 |
| 2020/0257300 | A1* | 8/2020 | Matus ............. | B60W 60/00188 |
| 2022/0001863 | A1* | 1/2022 | Haque ................... | G01C 21/28 |
| 2024/0034365 | A1* | 2/2024 | Tohdo ............... | B60W 60/0015 |

* cited by examiner

*Primary Examiner* — Mahmoud S Ismail
(74) *Attorney, Agent, or Firm* — Leydig, Voit & Mayer, Ltd.

(57) ABSTRACT

Provided are a data processing method and apparatus, an electronic device, and a medium, and relates to the technical field of computers, and in particular to the field of autonomous driving and intelligent transportation. An implementation is: obtaining risk information in driving scenario data of a driving scenario; determining a risk factor set based on the risk information, where the risk factor set includes a risk factor existing in the driving scenario data; and generating a simulated risk scenario based on the risk factor set, where the simulated risk scenario reflects at least one risk factor in the risk factor set.

20 Claims, 3 Drawing Sheets

DATA PROCESSING

TECHNICAL FIELD

The present disclosure relates generally to the field of computers techniques, in particular to the field of autonomous driving and intelligent transportation, and specifically to a data processing method and apparatus, an electronic device, a computer-readable storage medium, and a computer program product.

BACKGROUND

Artificial intelligence is a subject on making a computer simulate some thinking processes and intelligent behaviors (such as learning, reasoning, thinking, and planning) of a human, and involves both hardware-level technologies and software-level technologies. Artificial intelligence hardware technologies generally include the technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, machine learning/deep learning, big data processing technologies, and knowledge graph technologies.

In the field of autonomous driving, information about the surroundings of a vehicle (such as a lane line) can be sensed by using a computer vision method, thereby providing reference information for control of an autonomous driving system.

The methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides a data processing method and apparatus, an electronic device, a computer-readable storage medium, and a computer program product.

According to an aspect of the present disclosure, there is provided a data processing method, including: obtaining risk information in driving scenario data of a driving scenario; determining a risk factor set based on the risk information, where the risk factor set includes a risk factor existing in the driving scenario data; and generating a simulated risk scenario based on the risk factor set, where the simulated risk scenario reflects at least one risk factor in the risk factor set.

According to an aspect of the present disclosure, there is provided a data processing apparatus, including: a risk information obtaining unit configured to obtain risk information in driving scenario data of a driving scenario; a risk factor generation unit configured to determine a risk factor set based on the risk information, where the risk factor set includes a risk factor existing in the driving scenario data; and a simulation unit configured to generate a simulated risk scenario based on the risk factor set, where the simulated risk scenario reflects at least one risk factor in the risk factor set.

According to an aspect of the present disclosure, there is provided an electronic device, including: at least one processor; and a memory communicatively connected to the at least one processor, where the memory stores instructions executable by the at least one processor, and when executed by the at least one processor, the instructions cause the at least one processor to perform the method described above.

According to an aspect of the present disclosure, there is provided a non-transitory computer-readable storage medium storing computer instructions, where the computer instructions are used to cause a computer to perform the method described above.

According to an aspect of the present disclosure, there is provided a computer program product, including a computer program, where when the computer program is executed by a processor, the method described above is implemented.

According to one or more embodiments of the present disclosure, a risk factor/risk factors existing in a driving scenario can be mined from the driving scenario data, such that a more comprehensive and accurate risk scenario in a driving process can be obtained, and further, the robustness of a detection model involved in autonomous driving and the safety of an autonomous driving system can be improved using the obtained risk factor.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

The drawings exemplarily show embodiments and form a part of the specification, and are used to explain exemplary implementations of the embodiments together with a written description of the specification. The embodiments shown are merely for illustrative purposes and do not limit the scope of the claims. Throughout the drawings, identical reference signs denote similar but not necessarily identical elements.

DETAILED DESCRIPTION OF EMBODIMENTS

Figure 1:
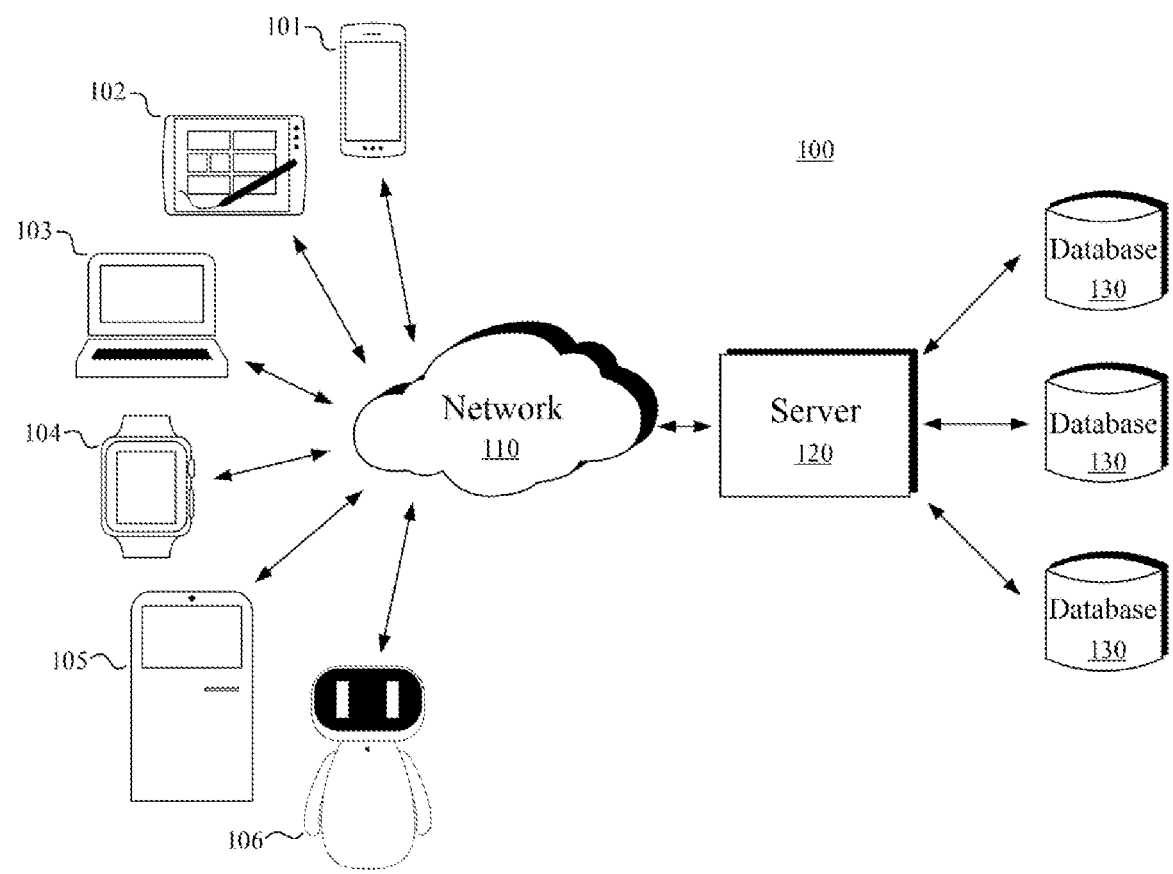
FIG. 1 is a schematic diagram of an exemplary system in which various methods described herein can be implemented according to an embodiment of the present disclosure.

Exemplary embodiments of the present disclosure are described below in conjunction with the accompanying drawings, where various details of the embodiments of the present disclosure are included to facilitate understanding, and should only be considered as exemplary. Therefore, those of ordinary skill in the art should be aware that various changes and modifications can be made to the embodiments described herein, without departing from the scope of the present disclosure. Likewise, for clarity and conciseness, description of well-known functions and structures are omitted in the following descriptions.

In the present disclosure, unless otherwise stated, the terms "first", "second", etc., used to describe various elements are not intended to limit the positional, temporal or importance relationship of these elements, but rather only to distinguish one component from the other. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

During autonomous driving, information about the surroundings of a vehicle may be sensed by various sensors in order to provide effective driving instructions for the vehicle. In an autonomous driving task, a lane line on a road where the vehicle is located may be recognized through lane line detection, such that the autonomous driving vehicle can travel within a lane defined by the lane line. Current lane line detection may be implemented based on a convolutional neural network technology. By performing feature extraction on an image in front of the vehicle, a certain number of possible lane line key points may be found, and the key points may be aggregated to generate final lane line prediction. However, various factors in the environment may affect the accuracy of a lane line detection model, and may cause the lane line detection model to output a false lane line recognition result, thus resulting in the vehicle deviating from a current road to be in a dangerous situation. Further, the various factors in the environment during the vehicle traveling may cause an accuracy of another prediction model in addition to the lane line detected model to be affected.

According to a method in the related art, a scenario for assessing a prediction model may be designed based on a predetermined keyword of a risk factor. However, an artificially determined risk factor cannot encompass a diversified risk scenario in practice. Therefore, for an autonomous driving system, there is a need to autonomously mine for a risk factor in a driving scenario.

Embodiments of the present disclosure will be described below in detail in conjunction with the drawings.

FIG. 1 is a schematic diagram of an exemplary system 100 in which various methods and apparatuses described herein can be implemented according to an embodiment of the present disclosure. Referring to FIG. 1, the system 100 includes one or more client devices 101, 102, 103, 104, 105, and 106, a server 120, and one or more communications networks 110 that couple the one or more client devices to the server 120. The client devices 101, 102, 103, 104, 105, and 106 may be configured to execute one or more application programs.

In an embodiment of the present disclosure, the server 120 can run one or more services or software applications that enable a method of the embodiments in the present disclosure to be performed.

In some embodiments, the server 120 may further provide other services or software applications that may include a non-virtual environment and a virtual environment. In some embodiments, these services may be provided as web-based services or cloud services, for example, provided to a user of the client device 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. A user operating the client device 101, 102, 103, 104, 105, and/or 106 may sequentially use one or more client application programs to interact with the server 120, thereby utilizing the services provided by these components. It should be understood that various system configurations are possible, which may be different from the system 100. Therefore, FIG. 1 is an example of the system for implementing various methods described herein, and is not intended to be limiting.

The user may use the client device 101, 102, 103, 104, 105, and/or 106 to obtain information, such as video or text data, used in the embodiments of the present disclosure. The client device may provide an interface that enables the user of the client device to interact with the client device. The client device may also output information to the user via the interface. Although FIG. 1 depicts only six types of client devices, those skilled in the art will understand that any number of client devices are possible in the present disclosure.

The client device 101, 102, 103, 104, 105, and/or 106 may include various types of computer devices, such as a portable handheld device, a general-purpose computer (such as a personal computer and a laptop computer), a workstation computer, a wearable device, a smart screen device, a self-service terminal device, a service robot, a gaming system, a thin client, various messaging devices, and a sensor or other sensing devices. These computer devices can run various types and versions of software application programs and operating systems, such as MICROSOFT Windows, APPLE iOS, a UNIX-like operating system, and a Linux or Linux-like operating system (e.g., GOOGLE Chrome OS); or include various mobile operating systems, such as MICROSOFT Windows Mobile OS, iOS, Windows Phone, and Android. The portable handheld device may include a cellular phone, a smartphone, a tablet computer, a personal digital assistant (PDA), etc. The wearable device may include a head-mounted display (such as smart glasses) and other devices. The gaming system may include various handheld gaming devices, Internet-enabled gaming devices, etc. The client device can execute various application programs, such as various Internet-related application programs, communication application programs (e.g., email application programs), and short message service (SMS) application programs, and can use various communication protocols.

The network 110 may be any type of network well known to those skilled in the art, and it may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (such as Bluetooth or Wi-Fi), and/or any combination of these and/or other networks.

The server 120 may include one or more general-purpose computers, a dedicated server computer (e.g., a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures relating to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above-mentioned operating systems and any commercially available server operating system. The server 120 can also run any one of various additional server application programs and/or middle-tier application programs, including an HTTP server, an FTP server, a CGI server, a JAVA server, a database server, etc.

In some implementations, the server 120 may include one or more application programs to analyze and merge data feeds and/or event updates received from users of the client device 101, 102, 103, 104, 105, and/or 106. The server 120 may further include one or more application programs to display the data feeds and/or real-time events via one or more display devices of the client device 101, 102, 103, 104, 105, and/or 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be used to store information such as an audio file and a video file. The databases 130 may reside in various locations. For example, a database used by the server 120 may be locally in the server 120, or may be remote from the server 120 and may communicate with the server 120 via a network-based or dedicated connection. The databases 130 may be of different types. In some embodiments, the database used by the server 120 may be, for example, a relational database. One or more of these databases can store, update, and retrieve data from or to the database, in response to a command.

In some embodiments, one or more of the databases 130 may also be used by an application program to store application program data. The database used by the application program may be of different types, for example, may be a key-value repository, an object repository, or a regular repository backed by a file system.

The system 100 of FIG. 1 may be configured and operated in various manners, such that the various methods and apparatuses described according to the present disclosure can be applied.

Figure 2:
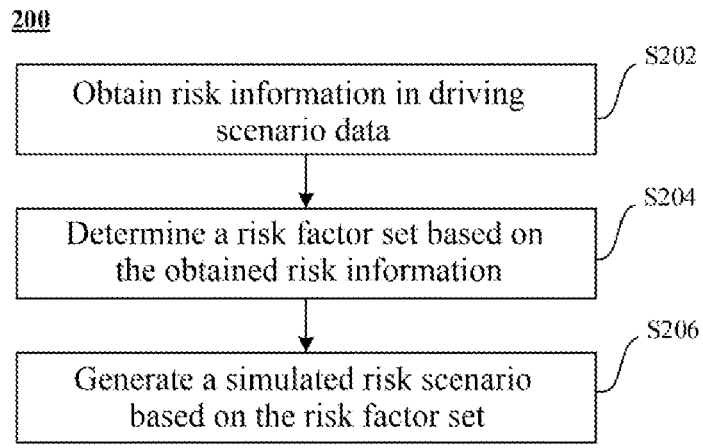
FIG. 2 is an exemplary flowchart of a data processing method according to an embodiment of the present disclosure.

FIG. 2 is an exemplary flowchart of a data processing method according to an embodiment of the present disclosure. The clients or servers shown in FIG. 1 may be used to perform a data processing method 200 shown in FIG. 2.

In step S202, risk information in driving scenario data of a driving scenario is obtained. The driving scenario data may be any data capable of describing various types of information in a scenario for a driving process. For example, the driving scenario data may include environment information around a vehicle and movement information of another traffic object (such as a vehicle and a pedestrian) around the vehicle in the driving process. The risk information refers to any form of data in the driving scenario data (e.g., an image, a text, an audio, etc.) that is related to the risks that exist during driving. A risk factor in driving scenarios can be obtained by analyzing the risk information.

In step S204, a risk factor set is determined based on the obtained risk information. The risk factor set includes a risk factor existing in the driving scenario data.

In step S206, a simulated risk scenario is generated based on the risk factor set. The simulated risk scenario may correspond to a simulated driving clip of certain duration, and the simulated risk scenario reflects at least one risk factor in the risk factor set.

By using this embodiment provided in the present disclosure, a risk factor/risk factors existing in the driving scenario can be mined from the driving scenario data, such that a more comprehensive and accurate risk scenario in a driving process can be obtained. Furthermore, a robustness of a detection model involved in autonomous driving and the safety of an autonomous driving system can be improved using the obtained risk factor(s).

Principles of the present disclosure will be further described in detail below.

In step S202, the risk information in the driving scenario data may be obtained.

In some embodiments, the driving scenario data may include a video corresponding to the driving scenario. The video of the driving scenario may be obtained from any public video website, and the video of the driving scenario can also be acquired in a real vehicle test by an image acquisition device during the real vehicle test. In some examples, the video of the driving scenario may be captured from the perspective of a driver, for example, a video acquired using an image acquisition device mounted in front of the driver's seat. In other examples, the video of the driving scenario may alternatively be a video acquired using an image acquisition device mounted on the top of a vehicle.

The video of the driving scenario may present information about the surroundings of the vehicle during a driving process. For example, the video of the driving scenario may include road information in front of the vehicle (such as a lane line, a turning mark, and a road sign), movement of another traffic object around the vehicle (such as a speed and direction of a surrounding vehicle and a walking trajectory of a pedestrian around the vehicle), and environment information around the vehicle (such as a weather condition and an illumination condition).

For the video of the driving scenario, the risk information may be a risk frame of the driving scenario. In this embodiment of the present disclosure, the risk frame is an image frame, and when an image of the risk frame is processed using a prediction model, an accurate prediction result cannot be obtained. In some implementations, the risk frame of the video of the driving scenario may be recognized using a lane line detection model. The lane line detection model used here is a trained lane line detection model.

A lane line in the video frame of the video may be marked to obtain a marked lane line. For example, a location of a real lane line in the video frame may be marked artificially. Further, lane line detection may be performed on the marked video frame to obtain a predicted lane line. For example, image information of the video frame may be detected using the trained lane line detection model to obtain a location of the predicted lane line in the video frame. Then, the above marked lane line and the above predicted lane line may be compared to determine whether the video frame is the risk frame. When an error between the marked lane line and the predicted lane line is greater than a predetermined error threshold, it may be considered that the current lane line detection model cannot accurately recognize the lane line in the video frame, and therefore a risk factor affecting the lane line detection model exists in the video frame. Therefore, the video frame may be determined as the risk frame.

Although determination of the risk frame is described in the above process by taking the lane line detection model as an example, it may be understood that any other prediction model may also be used to process the video frame to recognize the risk frame of the video that has a risk factor affecting the accuracy of the prediction model, without departing from the principles of the present disclosure.

In other embodiments, the driving scenario data may include a text describing the driving scenario. For example, a traffic accident report may be obtained as the above driving scenario data. The traffic accident report may include scenario information describing the driving process, especially information about a cause of the accident.

For the text of the driving scenario, the risk information may be a risk text in the text that describes a risk factor existing in the driving scenario. For example, for the traffic accident report, text information of the cause of the accident may be taken as the risk text.

A natural language processing method may be used to perform semantic analysis on the text to obtain the risk text that describes the risk factor existing in the driving scenario as the risk information from the text. For example, various natural language preprocessing models (such as Word2Vec and BERT) may be used to extract a semantic feature of the text and the semantic feature of the text then can be classified to determine which part of the text is the risk text. It may be understood that those skilled in the art may use any natural language processing method to identify a sentence or paragraph that describes the risk factor existing in the driving scenario as the risk information from the text, without departing from the principles of the present disclosure.

In step S204, the risk factor set is determined based on the obtained risk information. The risk factor set includes the risk factor existing in the driving scenario data.

The risk factor may be extracted from the risk information determined in step S202, and the extracted at least one risk factor may be determined as the risk factor set. The risk factor may include at least one of weather (such as rain, snow, and fog), illumination (such as dusk, late night, and brightness of a street light), a road form (such as a curve, a straight road, a ramp, or another road form), and movement of a surrounding object (a pedestrian or a vehicle).

For risk information in a form of a risk frame, the risk factor in the risk factor set may be obtained by performing target detection on the risk frame. For example, the above target detection may be implemented by a machine learning-based target detection model (such as RCNN and YOLO), to extract a keyword corresponding to the risk factor from the risk frame. In some implementations, weather information (such as rain and snow), driving behavior of a surrounding traffic object, illumination information, etc., that are identified in the risk frame may be determined as the above risk factor.

For risk information in a form of a risk text, the risk factor in the risk factor set may be extracted from the risk text based on a natural language processing method. For example, a keyword extraction model (such as TFIDF, TextRank, and a binary classification model) may be used to perform keyword extraction on the risk text, to obtain a keyword corresponding to the risk factor from the risk text.

By extracting and mining for a risk factor from video data and text data, a risk may be identified from a large number of real driving scenarios and a specific existing risk factor is identified, such that comprehensive risk factors that may occur during a driving process can be obtained.

In step S206, the simulated risk scenario may be generated based on the risk factor set. The simulated risk scenario may correspond to a simulated driving clip of certain duration, and the simulated risk scenario reflects at least one risk factor in the risk factor set.

In some embodiments, the simulated risk scenario may be configured based on the at least one risk factor in the risk factor set, such that the simulated risk scenario includes scenario content corresponding to the at least one risk factor. In some implementations, one or more risk factors may be randomly selected from the risk factor set determined in step S204, and the simulated risk scenario is configured based on the selected one or more risk factors. By using the above method, the simulated risk scenario may include any combination of one or more risk factors in the risk factor set, such that a diversified risk scenario can be generated. Such a diversified risk scenario can be further used to guide optimization of a prediction model (such as a lane line detection model) of autonomous driving, so as to improve the accuracy of the prediction model of autonomous driving.

In some implementations, the above simulated risk scenario may be generated using an autonomous driving simulation engine (such as Unity and GTA). By configuring parameters of the autonomous driving simulation engine based on the risk factor, a simulated risk scenario including the risk factor may be generated.

In other implementations, the above simulated risk scenario may be generated by transforming a real driving scenario. For example, a real driving scenario that does not have a risk factor may be transformed, to incorporate a selected risk factor therein. In some examples, a real driving clip may be transformed using a machine learning-based generative adversarial network, to generate a simulated risk scenario having the risk factor.

By using the above method, various simulated risk scenarios may be generated based on the risk factor set, to generate a diversified risk scenario. Using such a diversified risk scenario to assess a prediction model can improve the robustness of the prediction model for different risk factors.

In some embodiments, the method 200 may further include updating the risk factor set determined in step S204.

It may be determined, by using the prediction model to detect a video frame of the simulated risk scenario, whether the prediction model performs as expected when the selected at least one risk factor exists in the scenario. By using the prediction model to detect the video frame of the simulated risk scenario, the risk factor mined from the driving scenario data may be updated to obtain an updated risk factor set that is more valuable for assessment of the prediction model.

With the prediction model being a lane line detection model as an example, a lane line may be marked in the video frame of the simulated risk scenario to obtain a marked simulated lane line. For example, the lane line may be marked in the video frame of the simulated risk scenario through artificial marking, to obtain a specific location of the simulated lane line in the video frame. In another example, a simulated coordinate on a simulation map for a vehicle in the video frame of the simulated risk scenario may be determined, and the lane line may be marked in the video frame of the simulated risk scenario based on the simulated coordinate of the vehicle by using lane line information of the simulation map. By using such a method, based on a simulated location of the vehicle on the simulation map (in a format such as OpenDRIVE or Lanelet2) in the currently detected video frame, lane line information in the simulation map that corresponds to the simulated location may be obtained, and the lane line may be marked autonomously in the currently detected video frame by using the lane line information in the simulation map. Lane line detection may be performed on the video frame of the simulated risk scenario to obtain a predicted simulated lane line. For example, image information of the video frame may be processed using a trained lane line model to obtain a predicted location of the lane line in the video frame. Further, the risk factor set may be updated based on an error between the marked simulated lane line and the predicted simulated lane line.

In some implementations, whether a performance of the lane line detection model is as expected may be determined based on a result of a comparison between the error between the marked simulated lane line and the predicted simulated lane line and the predetermined error threshold. For example, when a difference between the error between the marked simulated lane line and the predicted simulated lane line and the predetermined error threshold is less than or equal to the predetermined error threshold, it may be considered that the lane line detection model performs as expected for the risk factor(s) in the currently detected simulated risk scenario. Conversely, when the difference between the error between the marked simulated lane line and the predicted simulated lane line and the predetermined error threshold is greater than the predetermined error threshold, it may be considered that the lane line detection model performs poorly for the risk factor(s) in the currently detected simulated risk scenario.

The risk factor set may be updated based on the performance of the prediction model. In some implementations, when the difference between the error between the marked simulated lane line and the predicted simulated lane line and the predetermined error threshold is less than or equal to the predetermined error threshold, that is, when the lane line detection model performs as expected, the risk factor set may be updated to remove the risk factor in the currently detected simulated risk scenario from the risk factor set. For example, the risk factor set may be updated using an evolutionary algorithm, a risk factor that can achieve good results for the lane line detection model may be gradually removed from the risk factor set through continuous iterations, and finally an updated risk factor set may be obtained, where the lane line detection model has a low detection accuracy for a risk factor in the updated risk factor set.

It may be understood that the prediction may be performed on the simulated risk scenario by using any other prediction model used by an autonomous driving system in addition to the lane line detection model.

Figure 3:
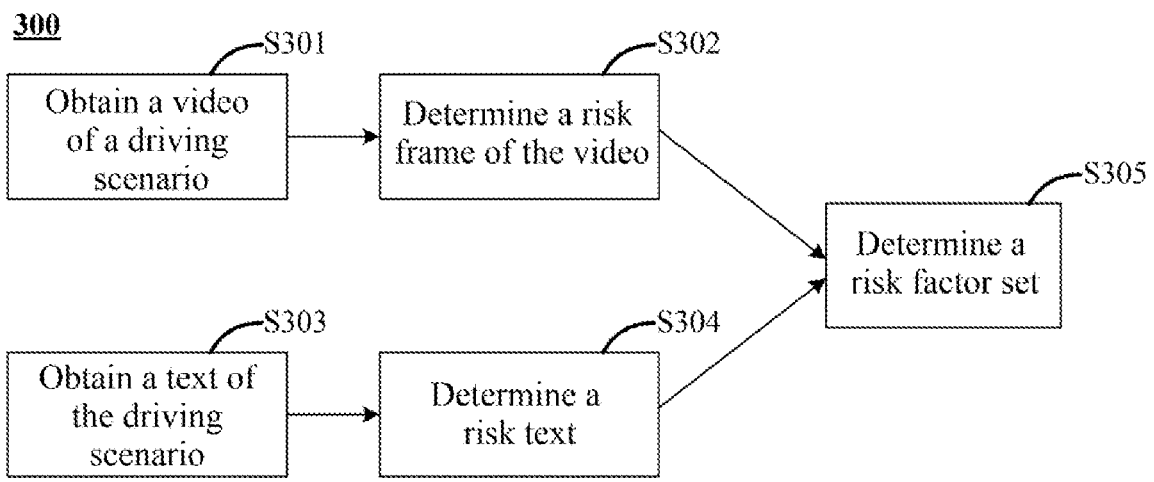
FIG. 3 shows an exemplary process of obtaining a risk factor set according to an embodiment of the present disclosure.

FIG. 3 shows an exemplary process 300 of obtaining a risk factor set according to an embodiment of the present disclosure.

As shown in FIG. 3, in step S301, a video of the driving scenario may be obtained. The above video of the driving scenario may be obtained from a public video database or may be a video acquired during a vehicle testing phase. A specific source of the video of the driving scenario is not limited here, provided that the video can represent a driving process over a period of time. The video of the driving scenario obtained in step S301 is marked. For example, a real location of a lane line in a video frame may be marked artificially.

In step S302, a prediction model may be used to process the video frame of the video of the driving scenario, to determine a risk frame of the video. For example, a lane line detection model may be used to perform lane line detection on the video frame, and a predicted location of the lane line in the video frame that is output by the lane line detection model may be compared with the real location of the marked lane line in the video frame. When a difference between the predicted location of and the real location of the lane line is greater than a threshold, it may be considered that the currently detected video frame is the risk frame.

In step S303, a text of the driving scenario may be obtained. For example, a traffic accident report may be obtained as the text of the driving scenario. A specific source of the text of the driving scenario is not limited here, provided that the text describes information about a driving process.

In step S304, text processing may be performed on the text of the driving scenario to obtain a risk text of a risk factor existing in the driving scenario. For example, a text paragraph in the text that describes a cause of the accident may be determined as the risk text.

In step S305, the risk factor set may be determined based on the risk frame determined in step S302 and/or the risk text determined in step S304. The risk frame may be processed by using a computer vision method to obtain a keyword corresponding to a risk factor existing in the risk frame. The risk text may be processed by using a natural language processing method to obtain a keyword corresponding to a risk factor existing in the risk text. Further, the risk factor set may be determined based on the determined keywords. In some embodiments, all keywords extracted from the risk frame and/or the risk text may be directly determined as the risk factor set. In other embodiments, keywords extracted from the risk frame and/or the risk text may be filtered, and the risk factor set is determined based on the filtered keywords. In some examples, the keywords may be filtered artificially. In other examples, the filtering may be performed based on an occurrence frequency of keywords obtained after keyword extraction from a large number of video frames and texts. For example, only a keyword with an occurrence frequency above a predetermined frequency threshold is reserved as a risk factor.

Figure 4:
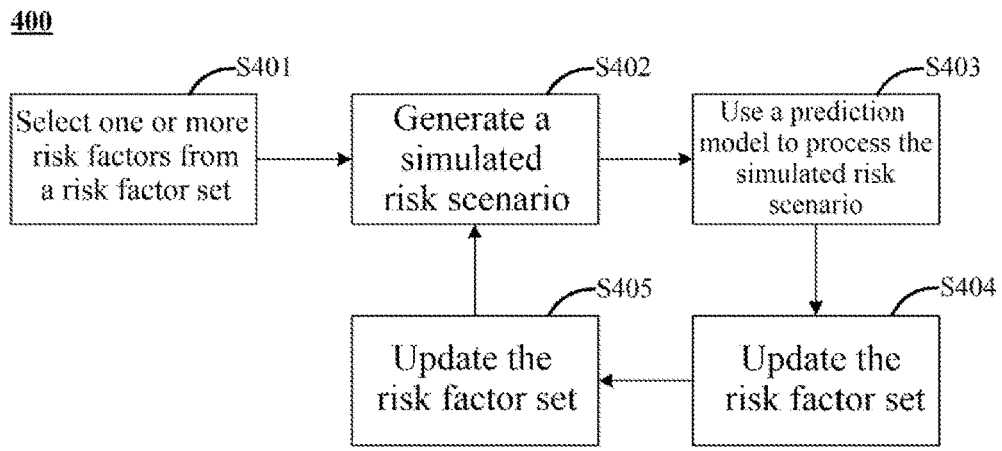
FIG. 4 shows an exemplary process for generating a risk scenario according to an embodiment of the present disclosure.

FIG. 4 shows an exemplary process 400 for generating a risk scenario according to an embodiment of the present disclosure.

As shown in FIG. 4, in step S401, one or more risk factors may be selected from a risk factor set and used for configuring the risk scenario. In some examples, the one or more risk factors may be randomly selected from the risk factor set and used for configuring the risk scenario, to generate a driving scenario having randomly combined risks.

In step S402, a simulated risk scenario may be generated based on the one or more risk factors in the risk factor set. The simulated risk scenario may include a driving clip having a risk corresponding to the selected one or more risk factors. The above simulated risk scenario may be generated by using an autonomous driving simulation engine or a machine learning method.

In step S403, the simulated risk scenario generated in step S402 may be processed using a prediction model. Based on a result output by the prediction model, it may be determined whether the result output by the prediction model is accurate enough in the scenario where a risk exists.

In step S404, the risk factor set may be updated based on the result output by the prediction model, to obtain an updated risk factor set. In some embodiments, an evolutionary algorithm may be used to update the risk factor set based on the accuracy of the output result of the prediction model. The updated risk factor set includes a risk factor that makes the prediction model output a result of low accuracy. A risk scenario that the current prediction model can hardly handle correctly may be effectively generated using the updated risk factor set, to provide effective guide for further optimization of the prediction model, thereby increasing the robustness of the prediction model.

After the completion of step S404, if the predetermined number of iterations has not been reached, the method 400 may proceed to step S402 to generate a simulated risk scenario based on the updated risk factor set, and repeat steps S403 and S404 to further update the risk factor set. When the predetermined number of iterations is reached, the method 400 may end, and the last updated risk factor set may be used as a final risk factor set.

Figure 5:
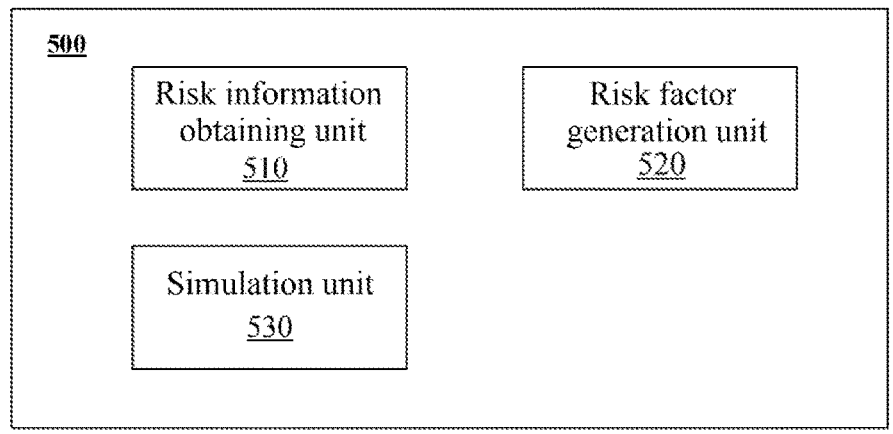
FIG. 5 is an exemplary block diagram of a data processing apparatus according to an embodiment of the present disclosure.

FIG. 5 is an exemplary block diagram of a data processing apparatus according to an embodiment of the present disclosure.

As shown in FIG. 5, a data processing apparatus 500 may include a risk information obtaining unit 510, a risk factor generation unit 520, and a simulation unit 530.

The risk information obtaining unit 510 may be configured to obtain risk information in driving scenario data of a driving scenario. The risk factor generation unit 520 may be configured to determine a risk factor set based on the obtained risk information, where the risk factor set includes a risk factor existing in the driving scenario data. The simulation unit 530 may be configured to generate a simulated risk scenario based on the risk factor set, where the simulated risk scenario reflects at least one risk factor in the risk factor set.

In some embodiments, the driving scenario data may include a video corresponding to the driving scenario. The risk information obtaining unit may be configured to: mark a lane line in a video frame of the video to obtain a marked lane line; perform lane line detection on the video frame of the video to obtain a predicted lane line; compare the marked lane line and the predicted lane line to determine a risk frame of the video as the risk information, where an error between the marked lane line and the predicted lane line in the risk frame is greater than a predetermined error threshold. The risk factor generation unit may be configured to: perform target detection on the risk frame to obtain a risk factor of the risk factor set.

In some embodiments, the driving scenario data may include a text describing the driving scenario. The risk information obtaining unit may be configured to perform semantic analysis on the text to obtain a risk text, as the risk information from the text, wherein the risk text describes the risk factor existing in the driving scenario. The risk factor generation unit may be configured to: extract the risk factor in the risk factor set from the risk text.

In some embodiments, the risk factor may include at least one of weather, illumination, a road form, and movement of a surrounding object.

In some embodiments, the simulation unit may be configured to configure the simulated risk scenario based on the at least one risk factor in the risk factor set, such that the simulated risk scenario includes scenario content corresponding to the at least one risk factor. In some implementations, the simulation unit may be configured to randomly select at least one risk factor from the risk factor set, and configure the simulated risk scenario based on the selected at least one risk factor.

In some embodiments, the simulated risk scenario may be generated using an autonomous driving simulation engine.

In some embodiments, the simulated risk scenario may be generated by transforming a real driving scenario.

In some embodiments, the data processing apparatus may further include an updating unit. The updating unit may be configured to mark a lane line in a video frame of the simulated risk scenario to obtain a marked simulated lane line; perform lane line detection on the video frame of the simulated risk scenario to obtain a predicted simulated lane line; and update the risk factor set based on an error between the marked simulated lane line and the predicted simulated lane line.

In some embodiments, the having a lane line in a video frame of the simulated risk scenario marked may include: determining simulated coordinates of a vehicle, on a simulation map, in the video frame of the simulated risk scenario, and having the lane line in the video frame of the simulated risk scenario marked based on the simulated coordinates by using lane line information in the simulation map.

Steps S202 to S206 shown in FIG. 2 may be performed using the units 510 to 530 shown in FIG. 5, which is not described in detail here.

In the technical solutions of the present disclosure, obtaining, storage, application, etc. of personal information of a user all comply with related laws and regulations and are not against the public order and good morals.

According to an embodiment of the present disclosure, there is further provided an electronic device, including: at least one processor; and a memory communicatively connected to the at least one processor, where the memory stores instructions executable by the at least one processor, and when executed by the at least one processor, the instructions cause the at least one processor to perform the method according to the embodiments of the present disclosure.

According to an embodiment of the present disclosure, there is further provided a non-transitory computer-readable storage medium storing computer instructions, where the computer instructions are used to cause the computer to perform the method according to the embodiments of the present disclosure.

According to an embodiment of the present disclosure, there is further provided a computer program product, including a computer program, where when the computer program is executed by a processor, the method according to the embodiments of the present disclosure is implemented.

Figure 6:
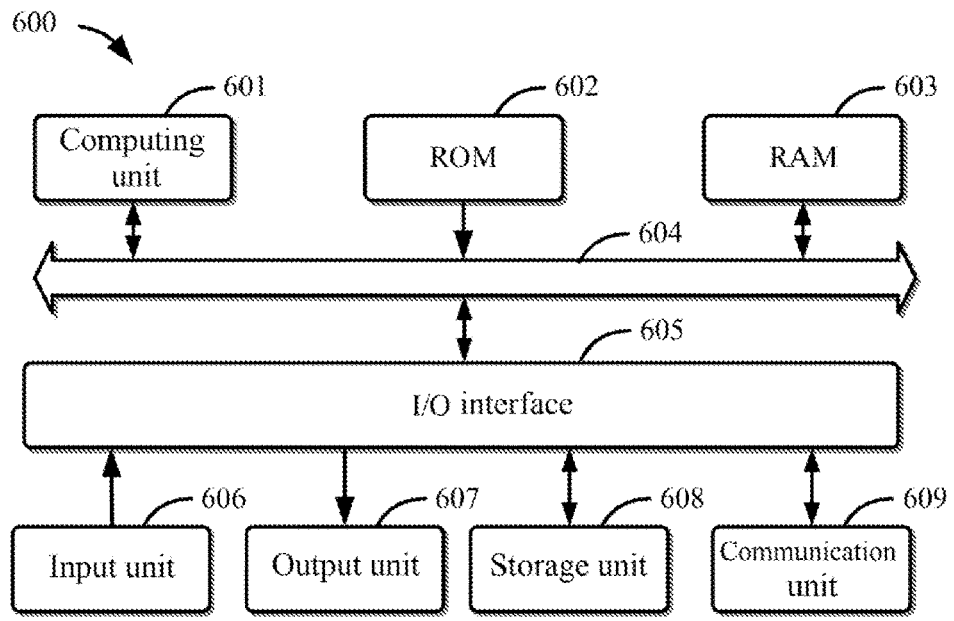
FIG. 6 is a structural block diagram of an exemplary electronic device that can be used to implement an embodiment of the present disclosure.

Referring to FIG. 6, a structural block diagram of an electronic device 600 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 6, the electronic device 600 includes a computing unit 601, which may perform various appropriate actions and processing according to a computer program stored in a read-only memory (ROM) 602 or a computer program loaded from a storage unit 608 to a random access memory (RAM) 603. The RAM 603 may further store various programs and data required for the operation of the electronic device 600. The computing unit 601, the ROM 602, and the RAM 603 are connected to each other through a bus 604. An input/output (I/O) interface 605 is also connected to the bus 604.

A plurality of components in the electronic device 600 are connected to the I/O interface 605, including: an input unit 606, an output unit 607, the storage unit 608, and a communication unit 609. The input unit 606 may be any type of device capable of entering information to the electronic device 600. The input unit 606 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 607 may be any type of device capable of presenting information, and may include, but is not limited to, a display, a speaker, a video/audio output terminal, a vibrator, and/or a printer. The storage unit 608 may include, but is not limited to, a magnetic disk and an optical disc. The communication unit 609 allows the electronic device 600 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, an 802.11 device, a Wi-Fi device, a WiMax device, a cellular communication device, and/or the like.

The computing unit 601 may be various general-purpose and/or special-purpose processing components with processing and computing capabilities. Some examples of the computing unit 601 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 601 performs the various methods and processing described above, for example, the method 200. For example, in some embodiments, the method 200 may be implemented as a computer software program, which is tangibly contained in a machine-readable medium, such as the storage unit 608. In some embodiments, a part or all of the computer program may be loaded and/or installed onto the electronic device 600 via the ROM 602 and/or the communication unit 609. When the computer program is loaded onto the RAM 603 and executed by the computing unit 601, one or more steps of the method 200 described above can be performed. Alternatively, in other embodiments, the computing unit 601 may be configured, by any other suitable means (for example, by means of firmware), to perform the method 200.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the drawings, it should be appreciated that the methods, systems, and devices described above are merely exemplary embodiments or examples, and the scope of the present invention is not limited by the embodiments or examples, but only defined by the appended authorized claims and equivalent scopes thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A data processing method, comprising:
   obtaining risk information in driving scenario data of a driving scenario, wherein the driving scenario data comprises a video corresponding to the driving scenario, and wherein the obtaining the risk information in the driving scenario data comprises: having a lane line in a video frame of the video marked to obtain a marked lane line; performing lane line detection on the video frame of the video to obtain a predicted lane line; and comparing the marked lane line and the predicted lane line to determine a risk frame of the video as the risk information, wherein an error between the marked lane line and the predicted lane line in the risk frame is greater than a predetermined error threshold;
   determining a risk factor set based on the obtained risk information, wherein the risk factor set comprises a risk factor existing in the driving scenario data;
   generating a simulated risk scenario based on the risk factor set, wherein the simulated risk scenario reflects at least one risk factor in the risk factor set;
   training a prediction model based on the simulated risk scenario to generate a trained prediction model; and
   controlling an operation of a vehicle based on the trained prediction model.

2. The data processing method of claim 1, wherein the determining the risk factor set based on the obtained risk information comprises:
   performing target detection on the risk frame to obtain the risk factor of the risk factor set.

3. The data processing method of claim 1, wherein the driving scenario data comprises a text describing the driving scenario.

4. The data processing method of claim 3, wherein the obtaining the risk information in the driving scenario data comprises:
   performing semantic analysis on the text to obtain a risk text as the risk information from the text, wherein the risk text describes the risk factor existing in the driving scenario.

5. The data processing method of claim 4, wherein the determining the risk factor set based on the obtained risk information comprises:
   extracting the risk factor of the risk factor set from the risk text.

6. The data processing method of claim 1, wherein the risk factor comprises at least one of weather, illumination, a road form, or movement of a surrounding object.

7. The data processing method of claim 1, wherein the generating the simulated risk scenario based on the risk factor set comprises:
   configuring the simulated risk scenario based on the at least one risk factor in the risk factor set, such that the simulated risk scenario comprises scenario content corresponding to the at least one risk factor.

8. The data processing method of claim 7, wherein the configuring the simulated risk scenario based on the at least one risk factor in the risk factor set comprises:
   randomly selecting the at least one risk factor from the risk factor set; and
   configuring the simulated risk scenario based on the at least one risk factor that is randomly selected.

9. The data processing method of claim 7, wherein the simulated risk scenario is generated using an autonomous driving simulation engine.

10. The data processing method of claim 7, wherein the simulated risk scenario is generated by transforming a real driving scenario.

11. The data processing method of claim 7, further comprising:
    having a lane line in a video frame of the simulated risk scenario marked to obtain a marked simulated lane line;
    performing lane line detection on the video frame of the simulated risk scenario to obtain a predicted simulated lane line; and
    updating the risk factor set based on an error between the marked simulated lane line and the predicted simulated lane line.

12. The data processing method of claim 11, wherein the having the lane line in the video frame of the simulated risk scenario marked comprises:
    determining a simulated coordinate on a simulation map for the vehicle in the video frame of the simulated risk scenario; and
    having the lane line in the video frame of the simulated risk scenario marked based on the simulated coordinate by using lane line information of the simulation map.

13. An electronic device, comprising:
    at least one processor; and a memory communicatively connected to the at least one processor, wherein the memory stores instructions executable by the at least one processor, and when executed by the at least one processor, the instructions cause the at least one processor to perform a method comprising steps of:

obtaining risk information in driving scenario data of a driving scenario, wherein the driving scenario data comprises a video corresponding to the driving scenario, and wherein the obtaining the risk information in the driving scenario data comprises: having a lane line in a video frame of the video marked to obtain a marked lane line; performing lane line detection on the video frame of the video to obtain a predicted lane line; and comparing the marked lane line and the predicted lane line to determine a risk frame of the video as the risk information, wherein an error between the marked lane line and the predicted lane line in the risk frame is greater than a predetermined error threshold;

determining a risk factor set based on the obtained risk information, wherein the risk factor set comprises a risk factor existing in the driving scenario data;

generating a simulated risk scenario based on the risk factor set, wherein the simulated risk scenario reflects at least one risk factor in the risk factor set;

training a prediction model based on the simulated risk scenario to generate a trained prediction model; and controlling an operation of a vehicle based on the trained prediction model.

14. The electronic device of claim 13, wherein the determining the risk factor set based on the obtained risk information comprises:

performing target detection on the risk frame to obtain the risk factor of the risk factor set.

15. The electronic device of claim 13, wherein the driving scenario data comprises a text describing the driving scenario.

16. A non-transitory computer-readable storage medium storing computer instructions, wherein the computer instructions are used to cause a computer to perform a method comprising steps of:

obtaining risk information in driving scenario data of a driving scenario, wherein the driving scenario data comprises a video corresponding to the driving scenario, and wherein the obtaining the risk information in the driving scenario data comprises: having a lane line in a video frame of the video marked to obtain a marked lane line; performing lane line detection on the video frame of the video to obtain a predicted lane line; and comparing the marked lane line and the predicted lane line to determine a risk frame of the video as the risk information, wherein an error between the marked lane line and the predicted lane line in the risk frame is greater than a predetermined error threshold;

determining a risk factor set based on the obtained risk information, wherein the risk factor set comprises a risk factor existing in the driving scenario data;

generating a simulated risk scenario based on the risk factor set, wherein the simulated risk scenario reflects at least one risk factor in the risk factor set;

training a prediction model based on the simulated risk scenario to generate a trained prediction model; and controlling an operation of a vehicle based on the trained prediction model.

17. The non-transitory computer-readable storage medium of claim 16, wherein the determining the risk factor set based on the obtained risk information comprises:

performing target detection on the risk frame to obtain the risk factor of the risk factor set.

18. The non-transitory computer-readable storage medium of claim 16, wherein the driving scenario data comprises a text describing the driving scenario.

19. The non-transitory computer-readable storage medium of claim 18, wherein the obtaining the risk information in the driving scenario data comprises:

performing semantic analysis on the text to obtain a risk text as the risk information from the text, wherein the risk text describes the risk factor existing in the driving scenario.

20. The non-transitory computer-readable storage medium of claim 19, wherein the determining the risk factor set based on the obtained risk information comprises:

extracting the risk factor of the risk factor set from the risk text.

* * * * *